United States Patent
Yue et al.

(10) Patent No.: US 8,341,467 B2
(45) Date of Patent: Dec. 25, 2012

(54) SYSTEM AND METHOD FOR WIRELESS TRANSMISSION USING HYBRID ARQ BASED ON AVERAGE MUTUAL INFORMATION PER BIT

(75) Inventors: Guosen Yue, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 601 days.

(21) Appl. No.: 12/498,042

(22) Filed: Jul. 6, 2009

(65) Prior Publication Data

US 2010/0042876 A1 Feb. 18, 2010

Related U.S. Application Data (60) Provisional application No. 61/088,371, filed on Aug. 13, 2008.

(51) Int. Cl.
*G06F 11/00* (2006.01)
(52) U.S. Cl. ...................................................... 714/704
(58) Field of Classification Search .................... 714/704
See application file for complete search history.

(56) References Cited

U.S. PATENT DOCUMENTS

| | | | |
|---|---|---|---|
| 6,662,337 B1* | 12/2003 | Brink | 714/792 |
| 7,583,747 B1* | 9/2009 | Damen et al. | 375/267 |
| 7,661,038 B2* | 2/2010 | Li et al. | 714/704 |
| 2007/0077952 A1* | 4/2007 | Sartori et al. | 455/515 |
| 2008/0086662 A1* | 4/2008 | Li et al. | 714/704 |
| 2009/0268833 A1* | 10/2009 | Ariyavisitakul et al. | 375/262 |
| 2009/0313528 A1* | 12/2009 | Chugg et al. | 714/758 |

* cited by examiner

*Primary Examiner* — Guerrier Merant
(74) *Attorney, Agent, or Firm* — Joseph Kolodka (57) ABSTRACT

A method and system for packet transmission in a hybrid automatic repeat request (ARQ) system. A modulation and a block length for a transmission are determined based on the average mutual information per bit. The average mutual information per bit is computed based on a current channel signal-to-noise ratio and a plurality of previous transmissions, each being transmitted with a respective coded block length, modulation form, and signal-to-noise ratio. A block error rate is computed for the potential block lengths and modulations based on the average mutual information per bit, and a throughput of the current transmission is determined based on the block error rate. The modulation form and the block length of the transmission are determined based on an analysis of the throughput. If the receiver cannot decode the current transmission, the transmitter repeats the computation to determine the modulation and the block length for retransmission.

21 Claims, 4 Drawing Sheets

SYSTEM AND METHOD FOR WIRELESS TRANSMISSION USING HYBRID ARQ BASED ON AVERAGE MUTUAL INFORMATION PER BIT

This application claims the benefit of U.S. Provisional Application No. 61/088,371, filed on Aug. 13, 2008, which is incorporated herein by reference.

FIELD OF THE INVENTION

The present invention relates generally to automatic repeat request (ARQ) schemes and more particularly to improving throughput in wireless transmission systems using adaptive hybrid ARQ schemes based on an average mutual information per bit.

BACKGROUND

In most wireless communication systems, the communication channels are time-varying. In order to maintain high throughput and reliability simultaneously over such time-varying channels, forward error correction (FEC) codes can be employed with the use of automatic repeat-request (ARQ) schemes, such as a hybrid ARQ scheme. In a known hybrid ARQ scheme, the receiver uses FEC codes to correct errors and triggers the retransmission when a residual error is detected. A simple hybrid ARQ scheme is Type-I hybrid ARQ, in which the receiver discards the previous transmission and performs the detection and decoding over the retransmitted signal only. Although this scheme conserves the available memory buffer by discarding the previously received packet, it is not an efficient method in terms of throughput.

Two further types of hybrid ARQ schemes of interest in data packet systems are Chase combining and incremental redundancy (IR) hybrid ARQ (i.e., type-II hybrid ARQ). In the Chase combining scheme, the repeated coded sequence is sent to the receiver upon receipt of the ARQ request. The receiver then combines received multiple copies of coded sequence using maximum ratio combining (MRC) for the detection. In type-II hybrid ARQ, additional parity bits are transmitted at each retransmission. The receiver then decodes the received transmission using all received sequences since they belong to one codeword. IR hybrid ARQ improves the throughput performance by providing a coding gain in additional to the diversity gain. Thus, both Chase combining and IR hybrid ARQ schemes provide throughput gain over type-I hybrid ARQ with the expense of additional buffers and complexity at the receiver.

To achieve high throughput efficiency, both Chase combining and IR hybrid ARQ schemes have been adopted in practical wireless systems. These schemes have also been included in recently established wireless standards. Hybrid ARQ can be classified as synchronous and asynchronous. In synchronous hybrid ARQ, the retransmissions are restricted to occur at known time instants. In asynchronous hybrid ARQ, the retransmissions may occur at any time. For asynchronous hybrid ARQ, additional signaling of the ARQ process number is required.

In terms of transmission attributes, the hybrid ARQ can be further classified as adaptive and non-adaptive. In accordance with adaptive hybrid ARQ, the transmitter may change the attributes at each retransmission including the modulation, coding rate, resource block allocation, etc. In accordance with non-adaptive hybrid ARQ, the modulation, coding rate, and the allocated resource block for retransmissions is the same as the original transmission.

Known solutions have considered non-adaptive hybrid ARQ in which the block length and modulation in each retransmission is assumed to be the same as that in the original transmission. Adaptive hybrid ARQ solutions only consider the binary coded system without employing the discrete quadrature amplitude modulation (QAM).

Additionally, non-adaptive IR hybrid ARQ has been investigated for random Gaussian signals, binary random codes, and low-density parity-check (LDPC) codes. Adaptive hybrid ARQ with Gaussian signaling and turbo coded modulations as well as adaptive IR hybrid ARQ for turbo-coded systems have also been investigated. While, adaptive hybrid ARQ with both IR and Chase combining for turbo coded modulation has been considered, in such investigations, the channel state information (CSI) is assumed unknown to the transmitter.

The design of adaptive hybrid ARQ based on known channel information has been investigated, but only based on capacity expressions for bit-interleaved coded modulations, which is not suitable for practical systems.

Accordingly, improved systems and methods for improving throughput in ARQ wireless transmission systems are desirable.

SUMMARY

The present invention generally provides a method and system for packet transmission in a hybrid automatic repeat request (ARQ) transmission system. More particularly, the present invention determines a modulation form and a block length based on the average mutual information per bit. The average mutual information per bit is computed based on a current channel signal-to-noise ratio and a plurality of previous transmissions. Each of the previous transmissions is transmitted with a respective coded block length, modulation form, and signal-to-noise ratio. A block error rate is computed for a selection of block lengths and modulations based on the average mutual information per bit, and a throughput of the current transmission is determined based on the block error rate. The throughput of the current transmission is analyzed and used to determine the modulation form and the block length of the current transmission.

The current transmission (i.e., encoded information) is transmitted from a transmitter to a receiver using the determined modulation form and block length. The receiver is configured to transmit to the transmitter an acknowledgement (e.g., ACK or NACK) indicating whether the transmission was successfully decoded. If the receiver did not successfully decode the current transmission, the transmitter can repeat the processes of computing an average mutual information per bit, computing a block error rate, determining the throughput, and determining the modulation and the block length. The receiver can then retransmit the transmission using the recomputed modulation form and block length.

These and other advantages of the invention will be apparent to those of ordinary skill in the art by reference to the following detailed description and the accompanying drawings.

DETAILED DESCRIPTION

Figure 1:
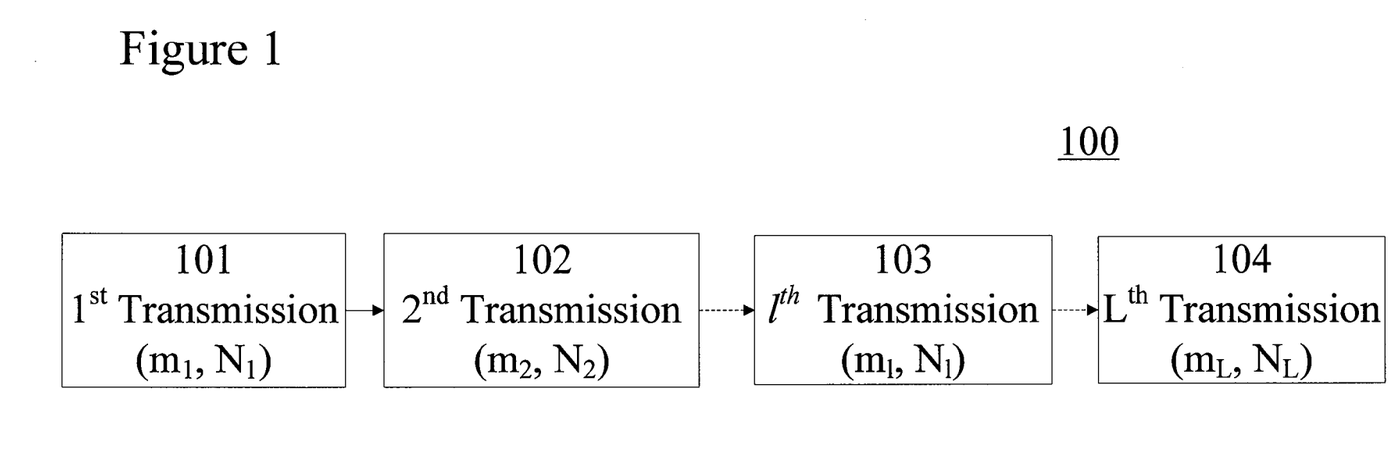
FIG. 1 is a representation of a series of transmissions in accordance with an embodiment of the present invention.

In accordance with an embodiment of the present invention an incremental redundancy (IR) hybrid automated repeat request (ARQ) scheme is provided. FIG. 1 illustrates a series of transmissions 100, each comprising a set of encoded bits that are transmitted in accordance with an embodiment of the present invention. The first transmission 101 has a sequence symbol length of $N_1$ and a modulation $m_1$, where the modulation is selected from one of the modulations predefined by the transmitter system. The second transmission, transmission 102, has sequence symbol length of $N_2$ and a modulation $m_2$. The sequence continues such that for each l, where l is less than the cardinality of the maximal number of transmissions L, the $l^{th}$ transmission has a sequence symbol length of $N_l$ and a modulation $m_l$, and the $L^{th}$ transmission has a sequence symbol length of $N_L$ and a modulation $m_L$. The $L^{th}$ transmission is the last retransmission attempt in a practical hybrid ARQ process before a packet loss is declared. If the $L^{th}$ packet is not successfully decoded by the receiver, the packet is determined lost and a new hybrid ARQ process is rescheduled for this packet. For illustrative purposes, FIG. 1 depicts the $l^{th}$ transmission 103 having sequence symbol length of $N_l$ and a modulation $m_l$, and the maximal transmission, the $L^{th}$ transmission 104, having sequence symbol length of $N_L$ and a modulation $m_L$.

Figure 2:
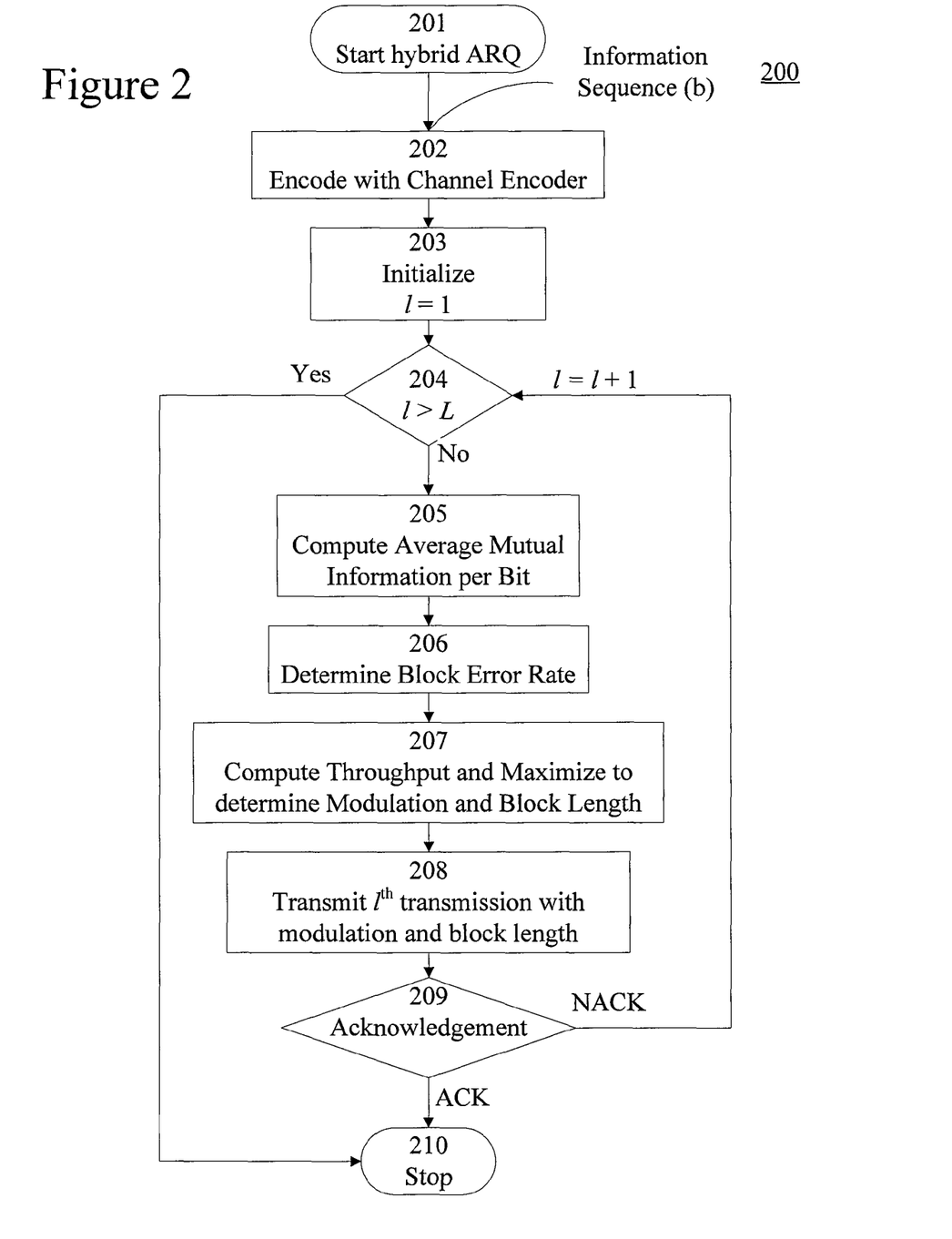
FIG. 2 is a flow chart illustrating a hybrid ARQ process in accordance with an embodiment of the present invention.

FIG. 2 is a flow chart illustrating a hybrid ARQ process 200 in accordance with an embodiment of the present invention. In this hybrid ARQ process 200 a modulation form and block length for each retransmission is determined based on the average mutual information per bit (MIB). At step 201, the hybrid ARQ process is started. As the process proceeds to step 202, an information sequence b is received for encoding by a (modulation form, block length) channel encoder (i.e., (n, k) channel encoder).

The system initializes a counter to 1 (i.e., the first transmission of the sequence) at step 203 and begins an iterative loop at step 204 for transmission of each set of encoded bits (i.e., each transmission) from 1 to L, the maximal transmission. If at decision 204, the counter is greater than the number of the maximal transmission (i.e., l>L), the hybrid ARQ process 200 stops at step 210. Otherwise, the process 200 proceeds to steps 205-208. For each transmission, steps 205-208, discussed in detail below, are performed to determine the associated modulation form and block length. The discussion below is generalized with the respect to the $l^{th}$ transmission.

At step 205, the average mutual information per bit is computed. The mutual information per bit is defined as follows. For a given transmission, in which each transmission symbol is selected from a particular quadrature amplitude modulation (QAM) constellation set, and for a particular QAM modulation $\Omega$ and signal to noise ratio (SNR) (i.e., the actual channel quality), the mutual information per bit is given by $I_\Omega(SNR_t)$. Thus, for all previous l-1 transmissions (i.e., j=1, . . . , l-1) having transmission forms $m_j$ defined by the system, coded block length $n_j$, the actual channel quality $SNR_j^*$ during the jth block transmission, and based on the current channel measurement $SNR_t$, the average mutual information per bit for all possible block lengths and modulations is given by:

$$I_{avg}(t, m) = \frac{1}{\sum_{j=1}^{l-1} n_j + n_t}\left(\sum_{j=1}^{l-1} I_{\Omega_j}(SNR_j^*)/q(\Omega_j) + I_{\Omega_m}(SNR_t)/q(\Omega_m)\right),$$

where $n_t$ is chosen from the coded block length needed to reach the next lower code rate and $\Omega_m$ is chosen from the available modulation forms predefined by the system. The value of $I_\Omega(SNR_t)$ can be computed numerically based on the channel capacity of the discrete inputs.

While the foregoing description and equations describe the computation of the average mutual information per bit over all previous transmissions, the average mutual information per bit can be computed over a subset of previous transmissions. For example, the system can use the most recent ten transmissions to compute the average. Typically, the larger the set of transmissions averaged, the more efficient and optimal the resulting determination of transmission modulation and block length. However, for a variety of reasons including reduction computational complexity and reduction of required computer memory, a subset of transmission can thus be analyzed.

If the code length exceeds a predetermined threshold codeword length n, Chase combining is applied to the repeated coded bits. Furthermore, if $\Omega_j=\Omega_k$ for a particular bit sequence, the Chase combining is equivalent to pre-demodulation symbol combining. Thus, the average mutual information per bit is then given by $I_{avg}=I_{\Omega_j}(SNR_j+SNR_k)/q(\Omega_j)$.

However, if the modulations of each symbol are different (i.e., $\Omega_j \neq \Omega_k$), then post-demodulation bit-level combining can be utilized to approximated the average mutual information as:

$I_{avg}=I_{\Omega_b}(I_{\Omega_b}^{-1}(I_{\Omega_j}(SNR_j)/q(\Omega_j))+I_{\Omega_b}^{-1}(I_{\Omega_k}(SNR_k)/q(\Omega_k))),$ where $\Omega_b$ denotes the binary phase shift keying (BPSK) modulations, and $I_{\Omega_b}^{-1}$ denotes the inverse function of $I_{\Omega_B}$.

Once the average MIB is computed, the block error rate (BLER) is computed at step 206 for all possible block lengths and modulations, using the computed average MIB. The block error rate (BLER) can be approximated by $$P_w(t, m) = Q\left(\frac{I_{avg}(t, m) - b_t}{a_t}\right),$$

where the approximation parameters ($a_t$, $b_t$) are determined for code rate $$R_t = \frac{k}{\left(\sum_{j=1}^{l-1} n_j + n_t\right)}.$$

Transmission of additional coded bits results in a code rate lower than current code rate since the same amount of information bits are carried for the entire hybrid ARQ process. It should be noted that, while it is preferable to compute the block error rate (BLER) for all possible block lengths and modulations as defined by the system, it is possible to compute the block error rate (BLER) for a smaller subset of possible modulation forms and block lengths. The system can therefore account for various external restrictions or preferences in selecting modulation forms and block lengths. For example, in order to maintain real-time operations, the set of possible block lengths and modulation forms can be reduces to a subset (e.g., the statistically most likely set of modulation forms and block lengths) to reduce the computation required, and hence reduce the computation time required.

At step 207, the throughput for the $l^{th}$ transmission is computed and analyzed. The throughput, $\eta(t, m)$, can be determined by $$\eta(t, m) = \frac{1 - P_w(t, m)}{\sum_{j=1}^{l-1} n_j / q(\Omega_j) + n_t / q(\Omega_m)}.$$

for the coded block length $n_t = n_l$, and the QAM constellation set $\Omega_m$, where $q(\ )$ determines a number of bits per symbol of a particular modulation form. The throughput is analyzed to find a (t, m) (i.e., modulation and block length), such that the throughput is optimized (e.g., maximized). That is, in accordance with an embodiment of the present invention, the modulation and block length is given by $$\{t^*, m^*\} = \underset{t,m}{\operatorname{argmax}} \eta(t, m).$$

Using the modulation and block length chosen at step 207, at step 208, the transmitter transmits the $l^{th}$ transmission to the receiver. At decision 209, the transmitter determines whether an acknowledgement has been received from the receiver. If the transmitter receives an acknowledgment that the transmission was successfully decoded (e.g., if the transmitter receives an "ACK"), the transmitter can stop the hybrid ARQ process at step 210. However, if the transmitter receives an indication that the transmission was not successfully decoded (e.g., if the transmitter receives a "NACK"), the transmitter increases the counter, l, and returns to step 204 to determine a new modulation and block length with which to retransmit the transmission.

Figure 3:
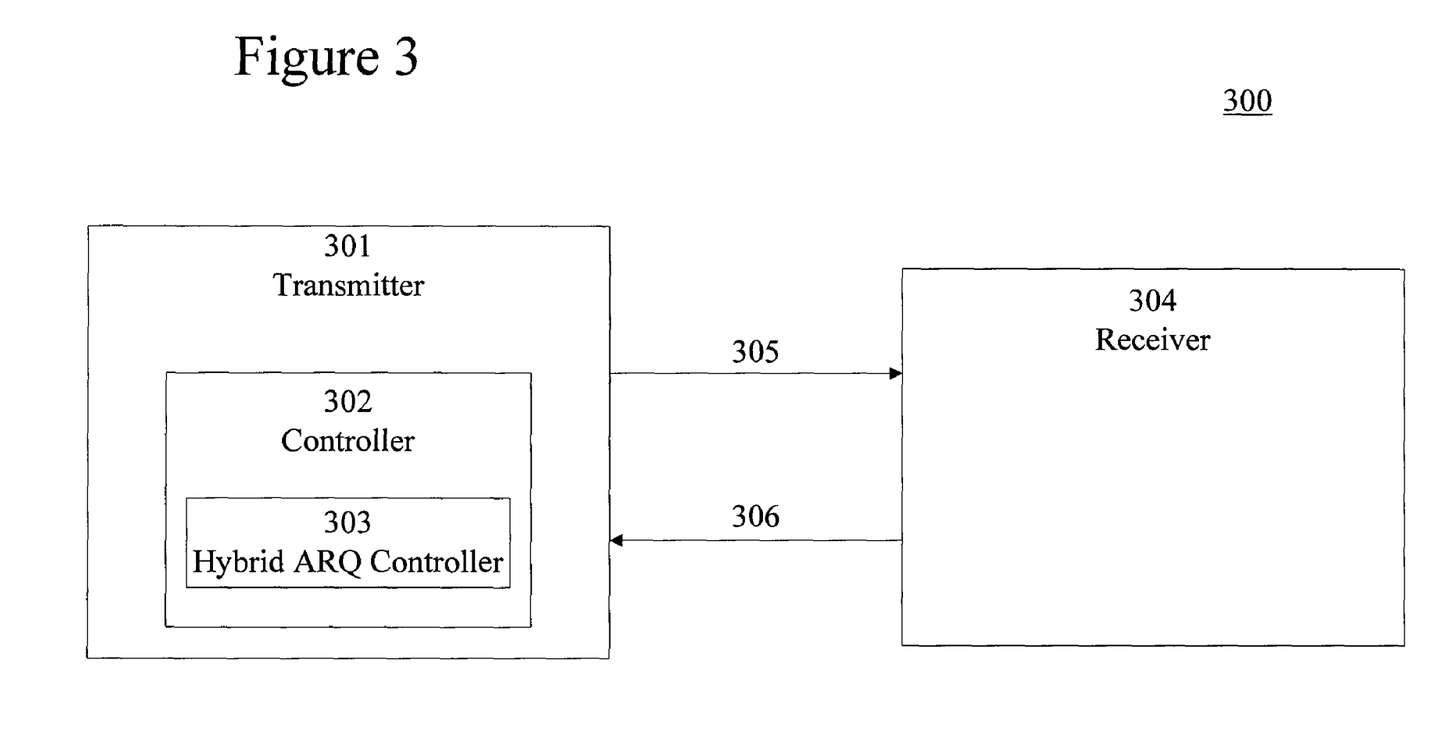
FIG. 3 is a schematic diagram of transmission system in accordance with an embodiment of the present invention.

FIG. 3 is a schematic diagram of transmission system 300 in accordance with an embodiment of the present invention. A transmitter 301 is depicted along with a receiver 304. The transmitter 301 includes a controller 302 and a sub-controller 303 (i.e., hybrid ARQ controller) for determining transmission or retransmission characteristics (e.g., modulation form and block length) based on the hybrid ARQ process 200 described above.

Thus, the transmitter can transmit the $l^{th}$ transmission 305 to the receiver 304, as described at step 208 of FIG. 2, in accordance with the modulation and block length determined at step 207. The receiver 304 can then send an acknowledgement to the transmitter 301, which is examined by the transmitter 301 at step 209. If the acknowledgement 306 received by the transmitter 301 is a NACK, the transmitter 301 can re-engage the sub-controller 303 to determine the modulation and block length to be used for re-transmission.

Figure 4:
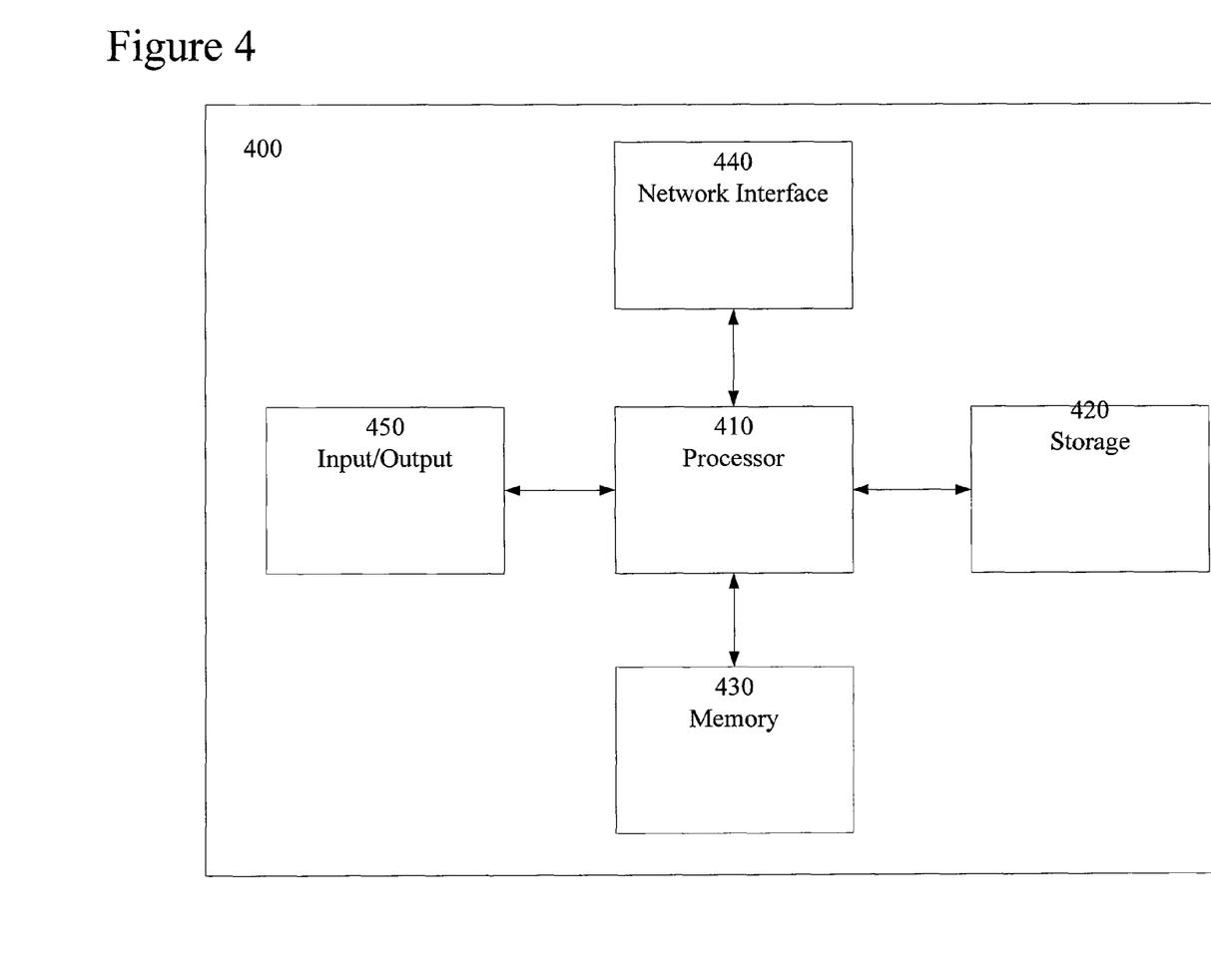
FIG. 4 is a schematic representation of a computer that may be used to implement methodologies in accordance with the present invention.

The above-described methods for hybrid ARQ transmission can be implemented on a computer using well-known computer processors, memory units, storage devices, computer software, and other components. That is, for example, the transmitter 301 and the receiver 304 illustrated in FIG. 3, which are typically part of a wireless base station, can include, or be provided with access to, a computer as described herein. A high-level block diagram of such a computer is illustrated in FIG. 4. Computer 400 contains a processor 410 which controls the overall operation of the computer 400 by executing computer program instructions which define such operations. The computer program instructions may be stored in a storage device 420, or other computer readable medium (e.g., magnetic disk, CD ROM, etc.), and loaded into memory 430 when execution of the computer program instructions is desired. Thus, the method steps of FIG. 2 can be defined by the computer program instructions stored in the memory 430 and/or storage 420 and controlled by the processor 410 executing the computer program instructions. For example, the computer program instructions can be implemented as computer executable code programmed by one skilled in the art to perform an algorithm defined by the method steps of FIG. 2. Accordingly, by executing the computer program instructions, the processor 410 executes an algorithm defined by the method steps of FIG. 2.

The computer 400 also includes one or more network interfaces 440 for communicating with other devices via a network. The computer 400 also includes input/output devices 450 that enable user interaction with the computer 400 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

We claim:

1. A method for determining a modulation form and a block length of a current transmission transmitted by a transmitter comprising:

computing an average mutual information per bit based on a current channel signal-to-noise ratio and a plurality of previous transmissions, each previous transmission having a respective coded block length, modulation form, and signal-to-noise ratio;

computing a block error rate for a plurality of block lengths and modulations based on the average mutual information per bit;

determining a throughput of the current transmission using the block error rate; and determining the modulation and the block length of the current transmission based on an analysis the throughput;

wherein the throughput is determined by $$\eta(t, m) = \frac{1 - P_w(t, m)}{\sum_{j=1}^{l-1} n_j/q(\Omega_j) + n_t/q(\Omega_m)}$$

wherein n is the throughput, $P_W$ is the block error rate,
l is a cardinality of the current transmission,
$n_j$ is a code length of the $j^{th}$ transmission,
$\Omega_j$ is a modulation form of the $j^{th}$ transmission,
$n_t$ is a code length chosen so as to obtain a lower code rates,
$\Omega_m$ is chosen from a plurality of predefined modulation forms, and
q( ) determines a number of bits per symbol of a particular modulation form.

2. The method of claim 1, further comprising transmitting the current transmission to a receiver using the determined modulation and block length.

3. The method of claim 2, further comprising:
receiving an acknowledgement from the receiver;
determining whether the receiver successfully decoded the current transmission based on the received acknowledgement; and
if the receiver did not successfully decode the current transmission, repeating the steps of computing an average mutual information per bit, computing a block error rate, determining the throughput, and determining the modulation and the block length.

4. The method of claim 3, wherein the received acknowledgement is one of an ACK and a NACK.

5. The method of claim 1, wherein the average mutual information per bit is determined by $$I_{avg}(t, m) = \frac{1}{\sum_{j=1}^{l-1} n_j + n_t}\left(\sum_{j=1}^{l-1} I_{\Omega_j}(SNR_j^*)/q(\Omega_j) + I_{\Omega_m}(SNR_l)/q(\Omega_m)\right)$$

wherein l is a cardinality of the current transmission,
$n_j$ is a code length of the $j^{th}$ transmission,
$n_t$ is a code length chosen so as to obtain a lower code rates,
I( ) is the mutual information per bit for a given signal to noise ratio,
$SNR_j^*$; is an actual signal to noise ratio during the $j^{th}$ transmission,
$SNR_t$ is a current measurement of a signal to noise ratio,
$\Omega_j$ is a modulation form of the $j^{th}$ transmission,
$\Omega_m$ is chosen from a plurality of predefined modulation forms, and
q( ) determines a number of bits per symbol of a particular modulation form.

6. The method of claim 1, wherein the block error rate is approximated by $$P_w(t, m) = Q\left(\frac{I_{avg}(t, m) - b_t}{a_t}\right),$$

and $a_t$, $b_t$) are approximation parameters for a code rate $R_t$ determined by $$R_t = \frac{k}{\left(\sum_{j=1}^{l-1} n_j + n_t\right)},$$

wherein l is a cardinality of the current transmission,
$n_j$ is a code length of the $j^{th}$ transmission,
$n_t$ is a code length chosen so as to obtain a lower code rates,
$I_{avg}$( ) is the average mutual information per bit, and
Q( ) determines a number of bits per symbol of a particular modulation form.

7. The method of claim 1, wherein the modulation form includes a quadrature amplitude modulation.

8. The method of claim 1, wherein the plurality of previous transmissions includes all previous transmissions over a channel of the current transmission.

9. The method of claim 1, further comprising:
comparing the block length to a predetermined codeword length;
comparing the modulation of the previous transmission to the modulation of the current transmission; and
applying Chase combining to repeated coded bits of the current transmission, in response to determining the block length exceeds the predetermined codeword length and the modulation of the previous transmission is equivalent to the modulation of the current transmission, such that the average mutual information per bit is given by $$I_{avg} = I_{\Omega_j}(SNR_j + SNR_k)/q(\Omega_j)$$

where $I_{\Omega_j}$ is the mutual information per bit for a given signal to noise ratio,
$SNR_j$ is an actual signal to noise ratio during the $j^{th}$ transmission,
$SNR_k$ is a current measurement of a signal to noise ratio,
q( ) determines a number of bits per symbol of a particular modulation form, and
$\Omega_j$ is a modulation form of the $j^{th}$ transmission.

10. The method of claim 1, further comprising:
comparing the block length to a predetermined codeword length;
comparing the modulation of the previous transmission to the modulation of the current transmission; and
applying post-modulation bit-level combining in response to determining the block length exceeds the predetermined codeword length and the modulation of the previous transmission is not equivalent to the modulation of the current transmission, such that the average mutual information per bit is given by $$I_{avg} = I_{\Omega_b}(I_{\Omega_b}^{-1}(I_{\Omega_j}(SNR_j)/q(\Omega_j)) + I_{\Omega_k}^{-1}(I_{\Omega_k}(SNR_k)/q(\Omega_k)))$$

where $\Omega_b$ denotes the binary phase shift keying (BPSK) modulations,
$SNR_j$ is an actual signal to noise ratio during the $j^{th}$ transmission,
$SNR_k$ is a current measurement of a signal to noise ratio,
q( ) determines a number of bits per symbol of a particular modulation form,
$\Omega_j$ is a modulation form of the $j^{th}$ transmission, and
$\Omega_k$ is a modulation form of the current transmission.

11. A wireless adaptive hybrid automatic repeat request transmission system for packet transmission comprising:
means for computing an average mutual information per bit based on a current channel signal-to-noise ratio and a plurality of previous transmissions, each previous transmission having a respective coded block length, modulation form, and signal-to-noise ratio;
means for computing a block error rate for all possible block lengths and modulations based on the average mutual information per bit;
means for determining a throughput of the current transmission using a result of the means for computing the block error rate; and
means for determining the modulation and the block length of the current transmission based on an analysis of a result of the means for determining the throughput;
wherein the throughput is determined by $$\eta(t, m) = \frac{1 - P_w(t, m)}{\sum_{j=1}^{l-1} n_j / q(\Omega_j) + n_t / q(\Omega_m)}$$

wherein $\eta$ is the throughput, $P_w$ is the block error rate,
l is a cardinality of the current transmission,
$n_j$ is a code length of the $j^{th}$ transmission,
$\Omega_j$ is a modulation form of the $j^{th}$ transmission,
$n_t$ is a code length chosen so as to obtain a lower code rates,
$\Omega_m$ is chosen from a plurality of predefined modulation forms, and
q( ) determines a number of bits per symbol of a particular modulation form.

12. The system of claim 11, further comprising means for transmitting the current transmission to a receiver using the determined modulation and block length.

13. The system of claim of claim 12, further comprising:
means for receiving an acknowledgement from the receiver; and
means for determining whether the receiver successfully decoded the current transmission based on the received acknowledgement.

14. The system of claim 13, wherein the received acknowledgement is one of an ACK and a NACK.

15. The system of claim 11, wherein the average mutual information per bit is determined by $$I_{avg}(t, m) = \frac{1}{\sum_{j=1}^{l-1} n_j + n_t} \left( \sum_{j=1}^{l-1} I_{\Omega_j}(SNR_j^*)/q(\Omega_j) + I_{\Omega_m}(SNR_l)/q(\Omega_m) \right)$$

wherein l is a cardinality of the current transmission,
$n_j$ is a code length of the $j^{th}$ transmission,
$n_t$ is a code length chosen so as to obtain a lower code rates,
I( ) is the mutual information per bit for a given signal to noise ratio,
signal-to-noise ratio$_j$ is a signal to noise ratio of the $j^{th}$ transmission,
signal-to-noise ratio$_t$ is a measurement of a signal to noise ratio,
$\Omega_j$ is a modulation form of the $j^{th}$ transmission,
$\Omega_m$ is chosen from a plurality of predefined modulation forms, and
q( ) determines a number of bits per symbol of a particular modulation form.

16. The system of claim 11, wherein the block error rate is approximated by $$P_w(t, m) = Q\left(\frac{I_{avg}(t, m) - b_t}{a_t}\right),$$

and $(a_t, b_t)$ are approximation parameters for a code rate $R_t$ determined by $$R_t = \frac{k}{\left(\sum_{j=1}^{l-1} n_j + n_t\right)},$$

wherein l is a cardinality of the current transmission,
$n_j$ is a code length of the $j^{th}$ transmission,
$n_t$ is a code length chosen so as to obtain a lower code rates,
$I_{avg}$( ) is the average mutual information per bit, and
Q( ) determines a number of bits per symbol of a particular modulation form.

17. The system of claim of claim 11, wherein the modulation form includes a quadrature amplitude modulation.

18. The system of claim 11, wherein the plurality of previous transmissions includes all previous transmissions over a channel of the current transmission.

19. The system of claim 11, further comprising:
means for comparing the block length to a predetermined codeword length;
means for comparing the modulation of the previous transmission to the modulation of the current transmission; and
means for applying Chase combining to repeated coded bits of the current transmission, in response to determining the block length exceeds the predetermined codeword length and the modulation of the previous transmission is equivalent to the modulation of the current transmission, such that the average mutual information per bit is given by $$I_{avg} = I_{\Omega_j}(SNR_j + SNR_k)/q(\neq_j)$$

where $I_{\Omega_j}$ is the mutual information per bit for a given signal to noise ratio,
$SNR_j$ is an actual signal to noise ratio during the $j^{th}$ transmission,
$SNR_k$ is a current measurement of a signal to noise ratio,
q( ) determines a number of bits per symbol of a particular modulation form, and
$\Omega_j$ is a modulation form of the $j^{th}$ transmission.

20. The system of claim 11, further comprising:
means for comparing the block length to a predetermined codeword length;
means for comparing the modulation of the previous transmission to the modulation of the current transmission; and
means for applying post-modulation bit-level combining in response to determining the block length exceeds the predetermined codeword length and the modulation of the previous transmission is not equivalent to the modulation of the current transmission, such that the average mutual information per bit is given by $$I_{avg} = I_{\Omega_b}(I_{\Omega_b}^{-1}(I_{\Omega_j}(SNR_j)/q(\Omega_j)) + I_{\Omega_b}^{-1}(I_{\Omega_b}(SNR_k)/q(\Omega_k)))$$

where $\Omega_b$ denotes the binary phase shift keying (BPSK) modulations,
$SNR_j$ is an actual signal to noise ratio during the $j^{th}$ transmission,
$SNR_k$ is a current measurement of a signal to noise ratio, q( ) determines a number of bits per symbol of a particular modulation form, $\Omega_j$ is a modulation form of the $j^{th}$ transmission, and $\Omega_k$ is a modulation form of the current transmission.

21. A method for determining a modulation form and a block length of a current transmission transmitted by a transmitter comprising:

computing an average mutual information per bit based on a current channel signal-to-noise ratio and a plurality of previous transmissions, each previous transmission having a respective coded block length, modulation form, and signal-to-noise ratio;

computing a block error rate for a plurality of block lengths and modulations based on the average mutual information per bit;

determining a throughput of the current transmission using the block error rate; and determining the modulation and the block length of the current transmission based on an analysis the throughput;

wherein the average mutual information per bit is determined by $$I_{avg}(t, m) = \frac{1}{\sum_{j=1}^{l-1} n_j + n_t}\left(\sum_{j=1}^{l-1} I_{\Omega_j}(SNR_j^*)\big/q(\Omega_j) + I_{\Omega_m}(SNR_l)\big/q(\Omega_m)\right)$$

wherein l is a cardinality of the current transmission, $n_j$ is a code length of the $j^{th}$ transmission, $n_t$ is a code length chosen so as to obtain a lower code rates, I( ) is the mutual information per bit for a given signal to noise ratio, $SNR_j^*$ is an actual signal to noise ratio during the $j^{th}$ transmission, $SNR_t$ is a current measurement of a signal to noise ratio, $\Omega_j$ is a modulation form of the $j^{th}$ transmission, $\Omega_m$ is chosen from a plurality of predefined modulation forms, and q( ) determines a number of bits per symbol of a particular modulation form.

* * * * *